United States Patent [19]

Mertl et al.

[11] Patent Number: 5,635,771
[45] Date of Patent: Jun. 3, 1997

[54] SECONDARY ACCUMULATOR CHARGING/ DISCHARGING FOR A MOTOR VEHICLE USING A CONTROLLABLE RESISTOR

[75] Inventors: Rainer Mertl, Garching; Erhard Otto, Groebenzell; Walter Streit, Ingolstadt; Kurt Maute, Sindelfingen; Wolfgang Zag, Weissach-Flacht; Dirk Katzenellenbogen, Wolfsburg, all of Germany

[73] Assignee: Bayerische Motoren Werke AG, Munich, Germany

[21] Appl. No.: 494,028

[22] Filed: Jun. 23, 1995

[30] Foreign Application Priority Data

Jun. 24, 1994 [DE] Germany ............... 44 22 231.9

[51] Int. Cl.$^6$ ........................... H02J 7/14
[52] U.S. Cl. .................. 307/10.7; 307/10.1; 307/20; 322/8; 320/6; 320/39
[58] Field of Search ................. 307/18, 19, 20, 307/21, 24, 38, 39, 44, 46, 64, 66, 9.1, 10.1, 10.7; 320/1, 2, 6, 12, 30, 39, 43, 48; 340/455; 322/7.8, 28, 90, 99, 62–64

[56] References Cited

U.S. PATENT DOCUMENTS

| | | | |
|---|---|---|---|
| 4,140,958 | 2/1979 | Groeschel | 320/39 |
| 4,207,511 | 6/1980 | Radtke | 320/6 |
| 5,162,720 | 11/1992 | Lambert | 320/6 |
| 5,166,538 | 11/1992 | Norton | 307/10.1 |
| 5,323,102 | 6/1994 | Torii et al. | 322/90 |
| 5,488,284 | 1/1996 | Dias et al. | 320/39 |

FOREIGN PATENT DOCUMENTS

| | | |
|---|---|---|
| 3520985 | 12/1986 | Germany . |
| 3841769 | 6/1990 | Germany . |
| 4028242 | 3/1992 | Germany . |
| 4213413 | 11/1992 | Germany . |

*Primary Examiner*—Richard T. Elms
*Attorney, Agent, or Firm*—Evenson, McKeown, Edwards & Lenahan, P.L.L.C.

[57] ABSTRACT

In the case of an electrical wiring for a motor vehicle having a primary system which includes a voltage-controlled generator, a primary energy accumulator as well as at least one primary energy consuming device, and having a paralleled secondary system which includes a secondary energy accumulator as well as at least one secondary energy consuming device, the secondary system includes a control unit with a controllable resistor connected to the generator. The control unit monitors the charge condition of the secondary energy accumulator. As a function of the currently determined charge condition of the secondary energy accumulator, the control unit, on the one hand, controls the controllable resistor in such a manner that, during the charging of the secondary energy accumulator, the primary system is not overloaded. Furthermore, the control unit connects and disconnects the secondary energy consuming device or devices in such a manner that, during the discharging of the secondary energy accumulator, there is no falling below a predetermined residual charge value.

15 Claims, 3 Drawing Sheets

SECONDARY ACCUMULATOR CHARGING/ DISCHARGING FOR A MOTOR VEHICLE USING A CONTROLLABLE RESISTOR

BACKGROUND AND SUMMARY OF THE INVENTION

This invention relates to electrical wiring for a motor vehicle and, more particularly, to electrical wiring for a motor vehicle having a primary system which includes a voltage-controlled generator, a primary energy accumulator as well as at least one primary energy consuming device, and having a paralleled secondary system which includes a secondary energy accumulator as well as at least one secondary energy consuming device.

Vehicle electrical wiring of this type is known from German Patent document DE 38 41 769 C1. In the case of this known vehicle wiring, the primary energy accumulator, specifically the starter battery, and the secondary energy accumulator, specifically the wiring battery, are connected with one another as soon as the generator becomes operative. When the generator current supply is low, this has the disadvantage that the wiring battery is charged by charge compensation at the expense of the starter battery when the charge condition of the wiring battery is poorer than that of the starter battery.

In the case of the known wiring, a switch is also mounted between the wiring battery and the consuming devices of the wiring, i.e., secondary energy consuming devices, and the remaining portion of the wiring. When the generator stops, this switch will open up as soon as the starter battery voltage falls under a permissible limit value. This measure protects the starter battery, i.e., the primary energy accumulator, only when the generator is stopped with respect to a complete discharge and, therefore, permits a partial discharge of the starter battery. At the start of the drive, the load to which the starter battery is subjected will increase when a charge compensation of the two batteries takes place at the expense of the starter battery. In an extreme case, this may lead to a complete discharge or destruction of the primary energy accumulator, specifically of the starter battery.

There is therefore needed an electrical wiring network for a vehicle which always ensures an optimal charge condition of the primary energy accumulator.

According to the present invention, this need is met in that the secondary system includes a control unit including a controllable resistor which is connected to the generator. The control unit monitors the charge condition of the secondary energy accumulator, and, as a function of the actual charge condition of the secondary energy accumulator, controls the controllable resistor and connects and disconnects the secondary energy consuming device or devices. This is done in such a manner that, on the one hand, during the charging of the secondary energy accumulator, the primary system is not overloaded and, on the other hand, during the discharge of the secondary energy system, the charge value does not fall below a predetermined residual charge value.

Since the primary system containing the generator, as a function of the electric load of the wiring, that is, practically, of the primary energy consuming devices and the operating condition of the internal-combustion engine driving the generator, cannot provide sufficient electric energy at all times, the wiring according to the present invention offers the possibility of controlling, to a certain extent, the charging current to the secondary energy accumulator and thus the loading of the primary system. In addition, through the use of the controllable resistor which influences the charging current to the secondary energy accumulator, the primary system is damped, whereby the harmonic characteristic of the wiring is reduced. However, it is a prerequisite in this respect that the secondary energy accumulator can take up a sufficient amount of current; that is, the secondary energy accumulator is not already completely charged.

According to a preferred embodiment of the present invention, the primary energy accumulator is arranged closer to the generator relative to the secondary energy accumulator. This has the result that the electric specific resistance between the generator and the primary energy accumulator is lower than the electric specific resistance between the generator and the secondary energy accumulator. Thus, during the charging of the two energy accumulators, the voltage drop on the feed line to the primary energy accumulator is lower than the voltage drop on the feed line to the secondary energy accumulator. This has the result that the charging of the primary energy accumulator always has priority and, therefore, always has an optimal charge condition.

If, for example, the starter of the motor vehicle internal-combustion engine is one of the primary energy consuming devices of the wiring according to the invention, then by always having an optimal charge condition of the primary energy accumulator, maximum startability, and hence the use of the motor vehicle, will always be ensured.

In an advantageous further embodiment of the invention, the current charge condition of the secondary energy accumulator is determined starting from a predetermined or predeterminable initial charge condition by the addition of the charge quantity supplied during the charging operation as well as by the subtraction of the charge quantity removed during the discharging operation. The efficiency of the secondary energy accumulator is also taken into account.

In this case, the charge quantity fed to the secondary energy accumulator is determined by the time integration of the charge current.

Analogously, the charge quantity removed from the secondary energy accumulator is determined by the time integration of the discharge voltage relative to the load resistor or to the sum of the load resistors.

When the wiring becomes operative, the electric charge contained in the secondary energy accumulator, that is, the charge condition of the secondary energy accumulator, is fixed at an initial value. This initial value can most easily be determined by approximation from the off-load voltage and the temperature of the secondary energy accumulator. Advantageously, this takes place in that, during the starting operation of the motor vehicle during which the secondary energy accumulator is preferably connected neither with its load nor with the primary system, the voltage of the secondary energy accumulator as well as its temperature are measured. During the operation of the wiring according to the invention, the charge condition of the secondary energy accumulator is then corrected according to the fed and removed charge quantity, while, in the case of the removed charge quantity, the efficiency of the secondary energy accumulator must be taken into account by means of a factor k.

According to another advantageous further embodiment of the present invention, the charge current is limited by the controllable resistor of the control unit of the secondary system to a maximum permissible current intensity value. As a result, excessive loading of the primary system is avoided.

According to a further embodiment of the wiring according to the invention, the steepness of the rise and drop of the charge current of the secondary energy accumulator is limited to a maximum permissible value by the controllable resistor of the control unit. As a result, interfering electromagnetic radiations are reduced to a minimum.

The controllable resistor of the control unit which determines the charge current of the secondary energy accumulator is advantageously formed by several field effect transistors which are either connected behind one another or in parallel.

Other objects, advantages and novel features of the present invention will become apparent from the following detailed description of the invention when considered in conjunction with the accompanying drawings.

DETAILED DESCRIPTION OF THE DRAWINGS

Figure 1:
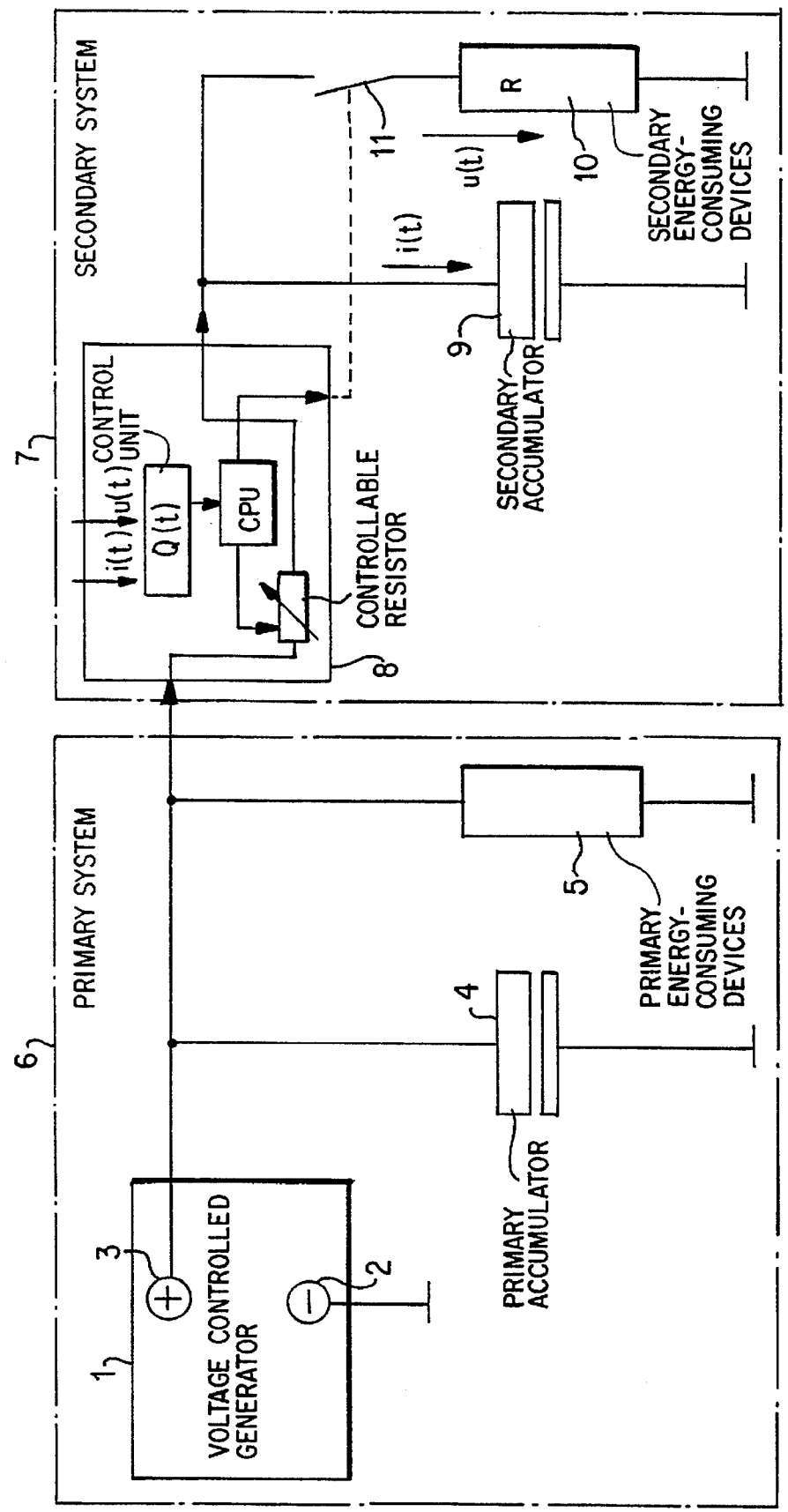
FIG. 1 is a schematic wiring diagram according to the present invention.

In the case of the wiring for a motor vehicle illustrated in FIG. 1, a voltage-controlled generator 1, such as a direct-current generator or an alternating-current generator provided with a rectifier, has two connections 2, 3. Via one connection 2, the generator 1 is connected to ground potential and, via the other connection 3, the generator 1 is connected with a primary energy accumulator 4 and primary energy-consuming devices of the primary system 6 (illustrated as a load resistor 5) as well as with the secondary system 7.

Figure 2:
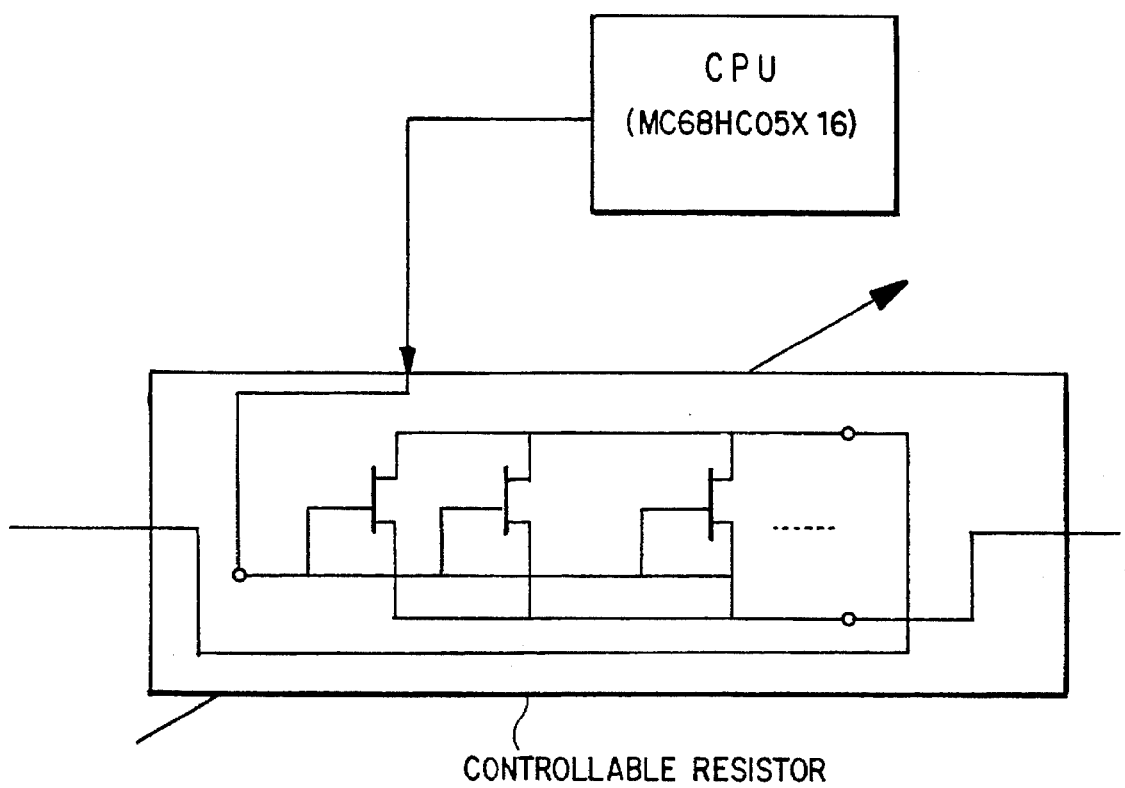
FIG. 2 is a schematic diagram of one embodiment of the controllable resistor.

The secondary system 7, which is electrically connected in parallel with the primary system 6, contains a control unit 8 having a controllable resistor, for example in the form of field effect transistors which are connected behind one another or in parallel (FIG. 2). By way of the resistor, the generator 1 is connected with the secondary energy accumulator 9 as well as with at least one secondary energy consuming device 10. The secondary energy consuming device 10, or one of several secondary consuming devices 10 may, for example, be the electric heating device of an exhaust gas catalyst of a motor vehicle internal-combustion engine. Between the secondary consuming device or devices 10 and the controllable resistor of the control unit 8, an electric switch 11 is provided. The electric switch 11 can be controlled by the control unit 8. The electric switch 11 connects and disconnects the secondary consuming device or devices 10 in such a manner that, when the secondary energy accumulator 9 is discharged, there is no falling below a predetermined desired residual charge value.

The controllable resistor is connected between an input and a first output of the control unit 8. The input is connected to the primary system 6. The first output is connected to the secondary energy accumulator 9 and the secondary consuming device or devices 10. A second output of the control unit 8 is connected to the electric switch 11.

The control unit 8 determines the actual charge condition Q (t) according to the formulas Eqn (1), Eqn (2) and Eqn (3) described below, by using the information of the charge current i(t) and the discharge voltage u(t) which are measured in a known manner and which are input-signals of the control unit 8. In dependence on the determined actual charge condition Q(t), the CPU controls the controllable resistor and/or the electric switch 11. FIG. 2 illustrates the CPU coupling with the controllable resistor. The CPU is, for example, a Motorola model MC68HC05X16. The CPU controls the resistor by controlling the gate voltage of several field effect transistors which are connected in parallel.

Through the use of the control unit 8, the charge condition of the secondary energy accumulator 9 is monitored and, as a function of the respective actual charge condition of the secondary energy accumulator, in addition to the above-described connection and disconnection of the secondary energy consuming device or devices 10, the controllable resistor contained in the control unit 8 is also controlled in such a manner that, when the secondary energy accumulator 9 is charged, the primary system 6 will not be overloaded. This will be particularly necessary when the primary system 6, containing the generator 1, as a function of the electric load 5 of the wiring and the operating conditions of the internal-combustion engine driving the generator, cannot provide sufficient energy. By controlling the charge current of the secondary energy accumulator 9 and therefore controlling the loading of the primary system 6, it is possible to dampen the primary system 6 for a clear reduction of the harmonic characteristic of the wiring. However, it is a prerequisite that the secondary energy accumulator 9 can take up sufficient electric current; that is, the secondary energy accumulator 9 is not already fully charged.

Through the use of the controllable resistor contained in the control unit 8, the charge current of the secondary energy accumulator 9 can also be limited to a maximum permissible current intensity value. This prevents excessive loading of the primary system 6.

Furthermore, through the use of the controllable resistor of the control unit 8, the steepness of the rise and drop of the charge current of the secondary energy accumulator 9 is limited to a maximum admissible value. As a result, interfering electromagnetic influences of the secondary system 7 and, therefore, of the whole wiring are kept to a minimum.

Figure 3:
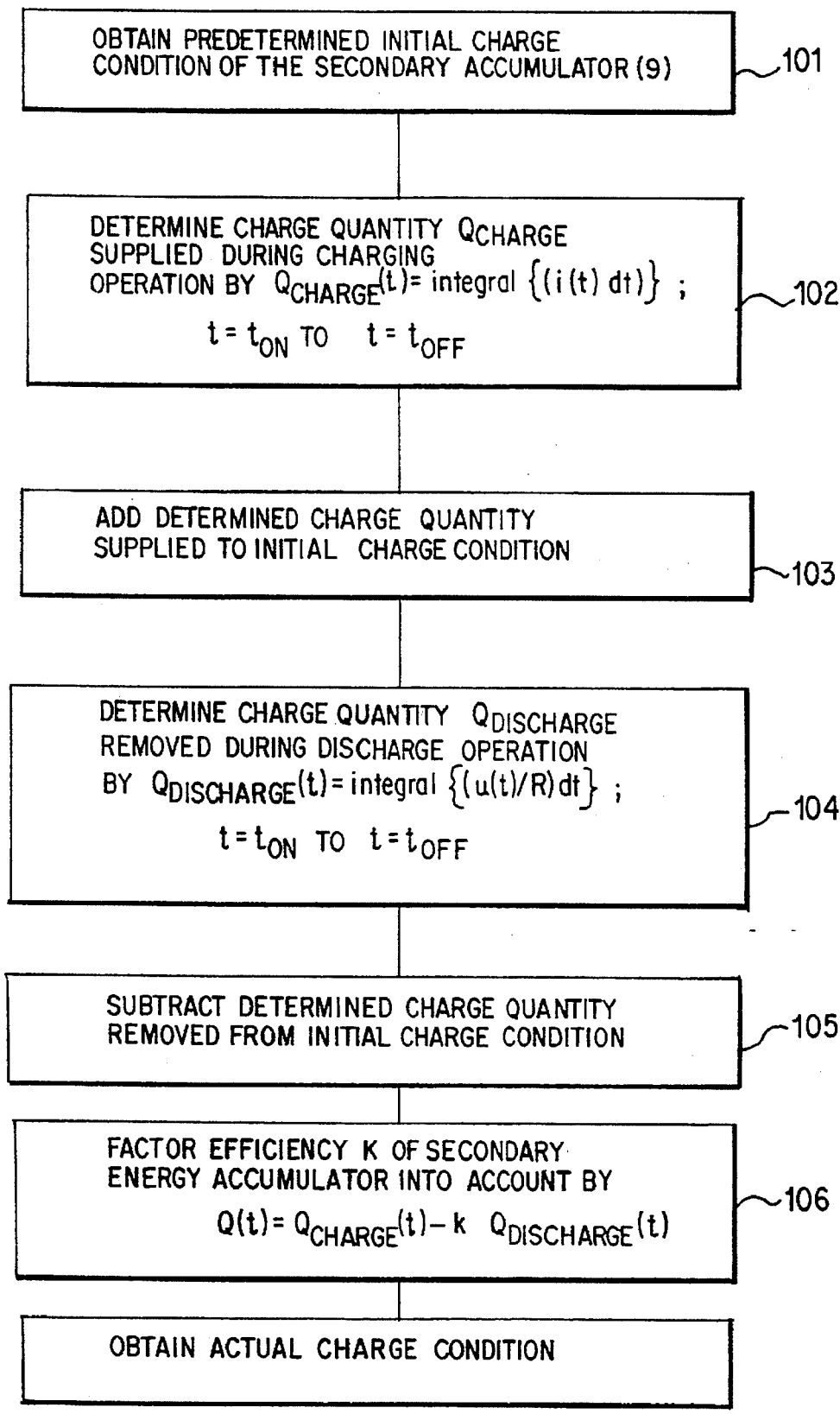
FIG. 3 is a flow chart for determining the actual charge condition of the secondary energy accumulator.

As mentioned above, the control of the controllable resistor contained in the control unit 8, as well as the connection and disconnection of the secondary consuming device or devices 10 and therefore the control of the electric switch 11, takes place as a function of the momentarily existing charge condition of the secondary energy accumulator 9. In this case, as shown in FIG. 3, the respective actual charge condition of the secondary energy accumulator 9 is determined (step 101) starting from a predetermined or predeterminable initial charge condition by the addition (step 103) of the charge quantity $Q_{charge}$ fed during the charge operation, as well as by the subtraction (step 105) of the charge quantity $Q_{discharge}$ removed during the discharge operation, while taking into account the efficiency factor k (step 106) of the secondary energy accumulator 9. In this case, the charge quantity $Q_{charge}$ supplied to the secondary energy accumulator 9 is determined (step 102) by the time integration of the charge current of the secondary energy accumulator 9 according to the formula:

$$Q_{charge}(t) = \text{integral } \{i(t)dt\} \quad (t=t_{on} \text{ to } t=t_{off}) \qquad \text{Eqn (1)}$$

Analogously, the charge quantity $Q_{discharge}$ removed from the secondary energy accumulator 9 is determined by the time integration of the discharge voltage relative to the load resistor of the secondary energy consuming device or devices 10 according to the following formula:

$$Q_{discharge}(t) = \text{integral } \{(u(t)/R) \, dt\} \quad (t=t_{on} \text{ to } t=t_{off}) \qquad \text{Eqn (2)}$$

The actual charge condition of the secondary energy accumulator 9 may be determined starting from a predetermined or measured initial charge condition while taking into account the efficiency factor k of the secondary energy accumulator 9 by forming the difference (step 106) from the charge quantity $Q_{charge}$ supplied to the secondary energy accumulator 9 and of the charge quantity $Q_{discharge}$ removed from the secondary energy accumulator 9 according to the following formula:

$$Q(t) = Q_{charge}(t) - k\, Q_{discharge}(t) \text{ with} \qquad \text{Eqn (3)}$$

k=factor for taking into account the efficiency of the secondary energy accumulator 9

When the wiring becomes operative, the initial value of the charge condition of the secondary energy accumulator 9 can be determined either by a measurement of the acid density or can be calculated in a known manner by approximation from the measured quantities of the off-load voltage and the temperature of the secondary energy accumulator 9.

It may be determined that, by means of the wiring according to the invention, an optimal charge condition of the primary energy accumulator 4 is always reached. Furthermore, in the case of the wiring according to the invention, the primary system 6 is neither overloaded, nor is the secondary energy accumulator 9 of the secondary system 7 discharged below a predetermined residual discharge value. This ensures a long life of the primary energy accumulator 4 as well as of the secondary energy accumulator 9. Finally, electromagnetic interferences of the wiring according to the invention are reduced to a minimal value.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Electrical circuit for a motor vehicle, comprising:
a primary system including a voltage-controlled generator, a primary energy accumulator coupled to said voltage-controlled generator, and at least one primary energy consuming device coupled to said voltage-controlled generator;
a secondary system coupled with said primary system, said secondary system including a secondary energy accumulator and at least one secondary energy consuming device;
wherein said secondary system further comprises a single control unit having a controllable resistor connected to said voltage-controlled generator, said control unit monitoring a charge condition of said secondary energy accumulator and, as a function of an actual charge condition of said secondary energy accumulator, controlling said controllable resistor and connecting and disconnecting said at least one secondary energy consuming device such that said primary system is not overloaded during a charging of said secondary energy accumulator and, during a discharging of said secondary energy accumulator, said secondary energy accumulator does not fall below a predetermined residual charge value.

2. Electrical circuit according to claim 1, wherein said primary energy accumulator is connected with said voltage-controlled generator via lower impedance lines relative to said secondary energy accumulator.

3. Electrical circuit according to claim 1, wherein said control unit is programmed to determine an actual charge condition of said secondary energy accumulator starting from a predetermined initial charge condition by adding a charge quantity ($Q_{charge}$) supplied during a charge operation and subtracting a charge quantity ($Q_{discharge}$) removed during a discharge operation, while factoring into account an efficiency factor (k) of said secondary energy accumulator.

4. Electrical circuit according to claim 2, wherein said control unit is programmed to determine an actual charge condition of said secondary energy accumulator starting from a predetermined initial charge condition, by adding a charge quantity ($Q_{charge}$) supplied during a charge operation and subtracting a charge quantity ($Q_{discharge}$) removed during a discharge operation, while factoring into account an efficiency factor (k) of said secondary energy accumulator.

5. Electrical circuit according to claim 3, wherein said control unit is programmed to determine said charge quantity ($Q_{charge}$) supplied to said secondary energy accumulator by integrating a charge current (i(t)) over time.

6. Electrical circuit according to claim 4, wherein said control unit is programmed to determine said charge quantity ($Q_{charge}$) supplied to said secondary energy accumulator by integrating a charge current (i(t)) over time.

7. Electrical circuit according to claim 3, wherein said control unit is programmed to determine the charge quantity ($Q_{discharge}$) removed from said secondary energy accumulator by integrating a discharge voltage (u(t)) relative to a load resistance of said at least one secondary energy consuming device over time.

8. Electrical circuit according to claim 4, wherein said control unit is programmed to determine the charge quantity ($Q_{discharge}$) removed from said secondary energy accumulator by integrating a discharge voltage (u(t)) relative to a load resistance of said at least one secondary energy consuming device over time.

9. Electrical circuit according to claim 1, wherein a charge current (i(t)) of said at least one secondary energy consuming device is limited via said controllable resistor of said control unit to a maximum permissible current intensity value.

10. Electrical circuit according to claim 1, wherein a steepness of a rise and a drop of a charge current (i(t)) of said secondary energy accumulator is limited by said controllable resistor of said control unit to a maximum permissible value.

11. Electrical circuit according to claim 1, wherein said controllable resistor of said control unit is formed by several field effect transistors connected in series.

12. Electrical circuit according to claim 11, wherein said controllable resistor of said control unit is formed by several field effect transistors connected in parallel.

13. A method for controlling the charging and discharging of an accumulator in a motor vehicle having a primary system including a voltage-controlled generator, a primary energy accumulator, and at least one primary energy consuming device, and having a secondary system coupled in parallel with said primary system which has a secondary energy accumulator as well as at least one secondary energy consuming device, the method comprising the steps of:
monitoring a charge condition of the secondary energy accumulator with a single control unit having a controllable resistor connected to the voltage-controlled generator;
controlling as a function of an actual charge condition of the secondary energy accumulator, the controllable resistor and a connecting and disconnecting of the at least one secondary energy consuming device such that during a charging of the secondary energy accumulator, the primary system is not overloaded and, during a discharging of the secondary energy accumulator, the secondary energy accumulator does not fall below a predetermined residual charge value.

14. A method according to claim 13, further comprising the steps of:

determining the actual charge condition of the secondary energy accumulator starting from a predetermined or predeterminable initial charge condition by the following steps:

adding a charge quantity ($Q_{charge}$) supplied during the charge operation, subtracting a charge quantity ($Q_{discharge}$) removed during the discharge operation, and factoring into account an efficiency factor (k) of the secondary energy accumulator.

15. A method according to claim 14, further comprising the steps of:

determining the charge quantity ($Q_{charge}$) supplied to the secondary energy accumulator by integrating over time a charge current (i(t)); and determining the charge quantity ($Q_{discharge}$) removed from the secondary energy accumulator by integrating a discharge voltage (u(t)) relative to a load resistor of the at least one secondary energy consuming device over time.

* * * * *